United States Patent [19]

Grumbach

[11] Patent Number: 4,606,299

[45] Date of Patent: Aug. 19, 1986

[54] INCUBATOR APPARATUS

[76] Inventor: Emil Grumbach, Gartenstrasse 2, D-6330 Wetzlar 13, Fed. Rep. of Germany

[21] Appl. No.: 680,672

[22] Filed: Dec. 12, 1984

[51] Int. Cl.$^4$ .................... A01K 41/02; A01K 41/04
[52] U.S. Cl. ........................................ 119/35; 119/37
[58] Field of Search ................... 119/35, 37, 39, 40, 119/42

[56] References Cited

U.S. PATENT DOCUMENTS

| | | | |
|---|---|---|---|
| 1,973,532 | 9/1934 | Jolliffe | 119/35 |
| 2,086,813 | 7/1937 | Markey | 119/35 |
| 2,646,930 | 7/1953 | Dryden | 119/35 X |
| 2,997,021 | 8/1961 | Bailey | 119/35 |
| 3,820,507 | 6/1974 | Dugan et al. | 119/35 |
| 4,274,364 | 6/1981 | Forseth | 119/35 |
| 4,501,228 | 2/1985 | Hinds | 119/37 |

Primary Examiner—Robert P. Swiatek
Attorney, Agent, or Firm—Flynn, Thiel, Boutell & Tanis

[57] ABSTRACT

An incubator apparatus for the brooding of any egg types with a closed housing. The brood is exposed to the same conditions in the entire apparatus. For this purpose an incubator apparatus is used which has a substantially rectangular or square housing compartmentalized by crosswalls into a brooding chamber and air-circulating chambers. The crosswalls divide the air channels into uniform and equal size cross sections. The air channels terminate below the lowermost brooding tray at the same distance from the bottom or at the right and left laterally next to the brooding tray. The air is warmed and circulated by fans which are provided with a heating source and which are arranged centrally on top or in the back equally spaced to the left and right from the air openings. A dust filter is arranged between the fan and the brooding chamber. The chnanels for ventilation and deaeration and the channels for humidification lead each to the suction side of the fan in the space between the dust filter and the fan and to the pressure side in the chamber. The channels are connected to a heatable water tank through which the air is enriched with moisture corresponding with the water temperature.

9 Claims, 9 Drawing Figures

INCUBATOR APPARATUS

FIELD OF THE INVENTION

The invention relates to a breeding and hatching apparatus (also known as an incubator for the brooding of eggs of any type to the hatching stage).

BACKGROUND OF THE INVENTION

Incubator apparatus of various types and designs are known. The basic purpose of the present invention is to brood highly sensitive egg material with extremely precise temperature and air humidity in order to exceed the results of natural brooding. It is an important factor that the conditions in the entire brooding chamber are maintained, namely that temperature deviations are 0.3° or less. A further characteristic is to prevent the dust which accumulates during the hatching stage of the animals or fowl from being distributed throughout the entire apparatus. All known apparatus have disadvantages in this regard.

The desired purposes are inventively attained by a breeding and hatching apparatus (incubator) having a substantially rectangular or square housing, in which one or more brooding trays are arranged therein one above the other at equal or adjustable distances from each other. It is preferable that one or more fans with heating sources be arranged such that the air path to all directions is approximately of the same size. Also the air must preferably be forcably guided so that same circulates around the egg material at an even speed, amount and temperature. This is achieved vertically or horizontally depending on the brooding chamber height and size. Horizontal air flow is preferable in brooding chambers under 40 cm. in height, since here the thermal lift is not yet as active and for that reason temperature differences would not occur. At greater heights, the fan or fans are preferably arranged centrally on top and the air is drawn automatically on both sides in equal sized channels downwardly in order to flow evenly upwardly through the egg trays equipped with gas-permeable bottom walls. During the hatching phase or stage of the animals or fowl, fine dust mixed with small hairs become prevalent. In order for these not to be distributed throughout the entire apparatus, a filter is arranged on the suction side of the fans. The filters simultaneously effect a small underpressure in the space between the filter and fan. Connections for humidification and for fresh air lead into the space. Further connections are provided on the pressure side of the fan or fans to positively enhance the air humidification process, namely at water temperatures of below 50° C. over 80% air humidity, at approximately 37.8° C. air temperature is achieved. Through the preferable circulation of fresh air in the region between the filter and the fan, an even distribution of fresh air occurs and also during cooling phases an evenly cool air flow occurs. The construction of the brooding and hatching trays with gas-permeable bottom walls are substantially known. Also it is possible to arrange the trays so that they can be tipped each to the left or right, this tipping being done manually or by a motor. Tipping and turning of the eggs is needed in order to prevent a sticking of the embryos to the inside surface of the eggs.

BRIEF DESCRIPTION OF THE DRAWINGS

Exemplary embodiments of the invention will be described in detail hereinbelow in connection with the drawings, in which.

DETAILED DESCRIPTION

Figure 2:
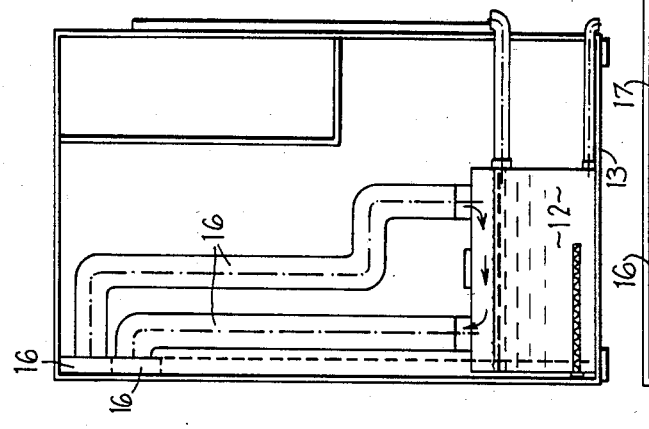
FIG. 2 is a sectional view taken along the line AB in FIG. 1.
Figure 4:
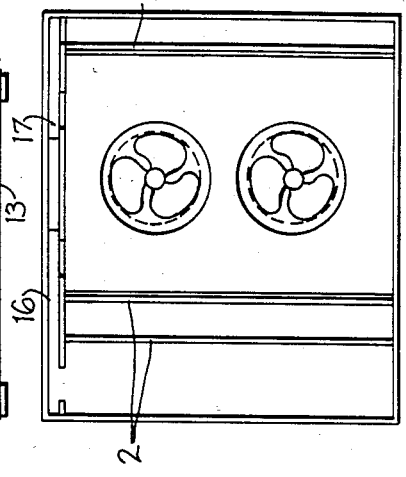
FIG. 4 is a cross-sectional view along the line EF in FIG. 1.
Figure 1:
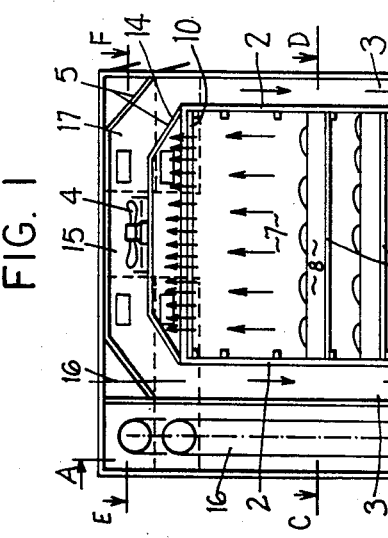
FIG. 1 is a cross-sectional front view of a breeding and rearing apparatus with a vertical air circulation.
Figure 3:
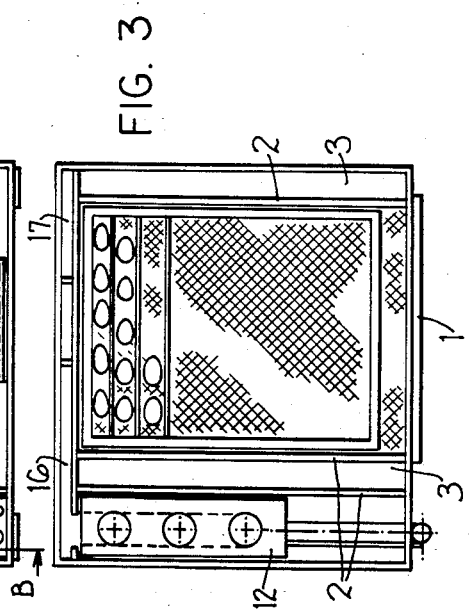
FIG. 3 is a cross-sectional view of said breeding and rearing apparatus taken along the line CD in FIG. 1.

The breeding and hatching apparatus, also known as an incubator apparatus, illustrated in FIGS. 1 to 5 has rectangular housings closed off on one side thereof by means of a door 1. The inside of the housing is divided off or compartmentalized by crosswalls or partitions 2 to form precise and uniform sized large side channels 3 for air circulation. Centrally and at the same distance from the side channels there are mounted one or more fans 4 with heating resistors. The fans circulate the warmed air. Portions of the partition walls 5 are sloped to enhance the flow of air around corners and the like.

The side channels 3 are, depending on whether the air is guided vertically or horizontally, open at the bottom or are provided with lateral air openings 6 through which the warmed air is evenly guided into a brooding chamber 7.

Figure 7:
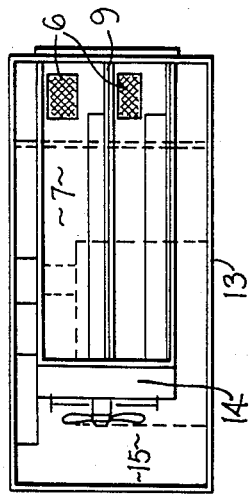
FIG. 7 is a cross-sectional side view taken along the line GH in FIG. 5.
Figure 6:
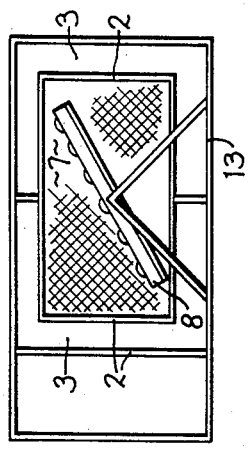
FIG. 6 is a cross-sectional front view of the same embodiment according to FIG. 5 with a tiltably supported tray system.

Plural trays 8 for eggs or the like are movably arranged as, for example, by tilting as shown in FIG. 6 in the brooding chamber 7. The bottom walls of the trays 8 and the support frames 9 are gas-permeable. In the embodiment according to FIGS. 1, 2, 3, 5 and 8 the bottom walls can, as shown in FIG. 7, also be non gas-permeable, since the horizontal air circulation pattern accomplishes the desired objective. This is particularly advantageous during the hatching process of the animals or fowl.

A dust filter 10 is arranged in the brooding chamber 7 depending on the air circulation characteristics and whether the fan 4 is arranged on the top or on the backside, in front of or on the suction side of the fan.

Humidification of the apparatus occurs through an evaporator cup 11 and/or through a heatable water tank 12. The water tank 12 has air circulated thereto through channels 16 inside the housing. The channels 16 extend to the suction side and pressure side of the fans 4. In this manner a desired air humidity corresponding with the water temperature is achieved.

Figure 9:
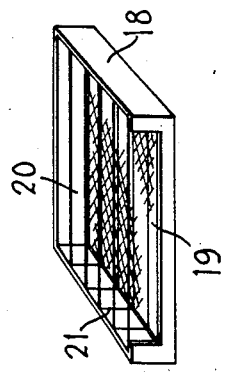
FIG. 9 is a perspective view of a hatching tray.
Figure 5:
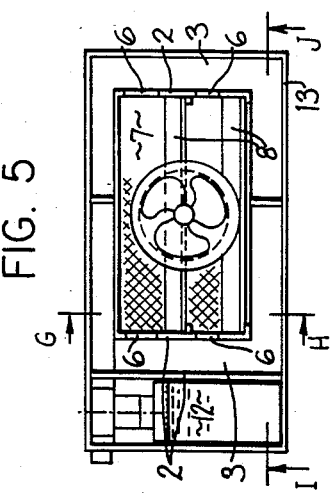
FIG. 5 is a cross-sectional view of a breeding and hatching apparatus with a horizontal air circulation system and horizontally lying trays.
Figure 8:
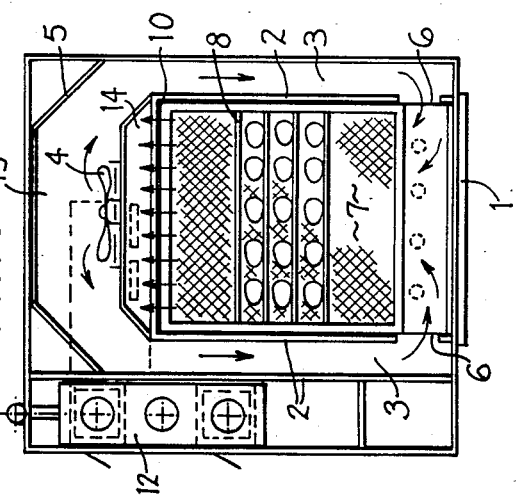
FIG. 8 is a cross-sectional view of the apparatus taken along the line IJ in FIG. 5.

FIG. 9 illustrates a hatching tray, which is laterally elevated and is compartmentalized by transparent crosswalls 20. The tray has sidewalls 18 and an air permeable bottom wall 19. Opposite ends of the transparent crosswalls 20 are received in upright slots 21 in the sidewalls 18. A front wall of the tray extending parallel to the crosswalls 20 can also be transparent. The hatched animals or fowl remain in this manner separate from one another.

The embodiments of the invention in which an exclusive property or privilege is claimed are defined as follows:

1. In an incubator apparatus for the brooding of any egg types comprising a bottom wall, plural sidewalls and a top wall defining a closed chamber having therein means defining a brooding chamber with support means for supporting at least one brooding tray, and a door providing access to said closed chamber and said brooding chamber, the improvement wherein said means defining said brooding chamber inside said closed chamber includes plural crosswalls which also define plural air-conducting channels, said crosswalls being spaced from said walls of said closed chamber so that said air channels have uniformly sized cross sections, wherein said air channels terminate at means defining an inlet to said brooding chamber over a region below said at least one brooding tray and at an equal distance from said walls defining said closed chamber, wherein at least one fan with a heat source is provided and is arranged on a central axis of said brooding chamber equidistant from said inlet means, wherein between said at least one fan and said brooding chamber there is arranged a dust filter extending over a majority of a cross-sectional area of said brooding chamber and at a location remote from said inlet means, said air channels being connected to a pressure side of said at least one fan and receiving equal volumes of air from said at least one fan, wherein a heatable water tank is provided with two connections, first means for connecting one of said connections to said pressure side of said at least one fan and second means for connecting the other of said connections to a suction side of said at least one fan, and said second means for connecting said water tank to said suction side of said at least one fan terminating in a region between said dust filter and said at least one fan, whereby said air channels are connected to said heatable water tank so that the pressure difference between said suction side and said pressure side of said at least one fan effects a flushing of air over the surface of water in said water tank, whereby said air corresponding with the water temperature is enriched with moisture, and wherein a control of the relative humidity of said air passing through said brooding chamber is regulated by a controllable water heating system on said water tank.

2. The incubator apparatus according to claim 1, wherein for effecting humidification during a breakdown of said water heating system, at least one evaporator cup is arranged beneath said at least one brooding tray in said inlet means to said brooding chamber.

3. The incubator apparatus according to claim 1, wherein said at least one fan is arranged centrally above said at least one brooding tray, and wherein two equally sized and uniform air channels extend downwardly from said at least one fan to a location beneath said at least tray and said inlet means to said brooding chamber, said air traveling vertically through said brooding chamber.

4. The incubator apparatus according to claim 1, wherein said at least one fan is arranged centrally at one side of said brooding chamber and said air channels extend to an opposite side, said air traveling horizontally through said brooding chamber.

5. The incubator apparatus according to claim 1, wherein said at least one tray is equipped with a gas-permeable bottom wall.

6. The incubator apparatus according to claim 1, wherein said at least one tray has laterally upstanding walls and crosswalls.

7. The incubator apparatus according to claim 6, wherein said crosswalls consist of a transparent material.

8. The incubator apparatus according to claim 7, wherein a sidewall of said tray extending parallel to said crosswalls consist of a transparent material.

9. The incubator apparatus according to claim 1, wherein said at least one tray is equipped with a seal bottom wall.

* * * * *